(12) United States Patent
Cornolti et al.

(10) Patent No.: US 6,669,169 B2
(45) Date of Patent: Dec. 30, 2003

(54) BLEED DEVICE AND KIT FOR HYDRAULIC CIRCUITS

(75) Inventors: Raffaello Cornolti, Sorisole (IT); Alberto Previtali, Palazzago (IT)

(73) Assignee: Freni Brembo S.p.A., Curno (IT)

( * ) Notice: Subject to any disclaimer, the term of this patent is extended or adjusted under 35 U.S.C. 154(b) by 0 days.

(21) Appl. No.: 10/182,585

(22) PCT Filed: Jan. 23, 2001

(86) PCT No.: PCT/EP01/00685

§ 371 (c)(1),
(2), (4) Date: Jan. 27, 2003

(87) PCT Pub. No.: WO01/56853

PCT Pub. Date: Aug. 9, 2001

(65) Prior Publication Data

US 2003/0141478 A1 Jul. 31, 2003

(30) Foreign Application Priority Data

Jan. 31, 2000 (EP) .............................................. 00830067

(51) Int. Cl.[7] .................................................. B60T 11/30
(52) U.S. Cl. .................................. 251/149.6; 251/149.9
(58) Field of Search ..................... 251/142, 149.1–149.9

(56) References Cited

U.S. PATENT DOCUMENTS

| | | | | |
|---|---|---|---|---|
| 4,402,340 A | * | 9/1983 | Lockwood, Jr. | 251/149.8 |
| 4,541,457 A | * | 9/1985 | Blenkush | 251/149.9 |
| 4,786,029 A | * | 11/1988 | Laipply et al. | 251/149.6 |
| 4,936,544 A | * | 6/1990 | Bartholomew | 251/149.6 |
| 5,365,972 A | * | 11/1994 | Smith, III | 251/149.8 |
| 5,683,148 A | * | 11/1997 | Li et al. | 251/149.5 |
| 5,692,538 A | * | 12/1997 | Smith, III | 251/149.8 |

FOREIGN PATENT DOCUMENTS

| | | |
|---|---|---|
| DE | 9012781 | 11/1990 |
| GB | 2086543 | 5/1982 |
| WO | 9819074 | 5/1998 |

\* cited by examiner

Primary Examiner—Paul J. Hirsch
(74) Attorney, Agent, or Firm—Kenyon & Kenyon (57) ABSTRACT

A bleed device for hydraulic circuits and a kit for bleeding are described that enable bleeding of the hydraulic circuit independently of the removal or slackening of the bleed device. In one embodiment, the bleed device comprises two opposing ends having a bleed duct extending through them. One end is designed to close the aperture of the hydraulic circuit. The other end is part of a quick-release connector and is designed to couple with the other part of the quick-release connector, whereby the bleed device may be connected to a bleed liquid collection vessel. Also, coupling of the quick-release connector simultaneously opens a one-way check valve in the bleed duct. The one-way check valve closes during normal operation of the hydraulic circuit. A protective cap on the bleed device keeps foreign matter from fouling the quick-release connector end.

13 Claims, 6 Drawing Sheets

BLEED DEVICE AND KIT FOR HYDRAULIC CIRCUITS

FIELD OF THE INVENTION

The present invention relates to a bleed device for hydraulic circuits, particularly for hydraulic brake circuits for vehicles that does not require loosening of the hydraulic drain plug.

BACKGROUND OF THE INVENTION

As is known, in hydraulic brake systems, normally on each brake, there is provided a bleed device or drain device which, in most cases, is made in the form of a threaded plug, screwed into an aperture of the hydraulic brake circuit and having a conical end which, when the plug is tightened in the aperture, bears on a seat of the aperture and acts as a valve member, or obturator, or a stopper for the aperture. In order for the required degree of sealing to be achieved, the stopper must be tightened against the seat with a predetermined force. This tightening, at the time of assembly of the brake, is carried out correctly by way of torque spanners.

A drain duct or bleed duct is formed axially in the plug, and can be connected hydraulically to the hydraulic circuit when the plug is slackened in the aperture. The first filling of the hydraulic brake circuit is normally carried out under a vacuum, and on this occasion it is not necessary to bleed the hydraulic circuit by slackening the bleed plugs. Subsequently, when brake maintenance operations are carried out, it is possible to bleed the brake circuit by connecting the bleed duct to a small tube which drains into a bleed vessel, by pressurizing the hydraulic circuit with the plug closed, slackening the plug so that air bubbles are expelled through the bleed duct, and then tightening the plug again to close the hydraulic circuit. The operation is repeated several times for each brake, until the air or other compressible gases, which would adversely affect the operation of the brakes, are completely bled from the hydraulic circuit.

On these occasions, it is possible that the optimal tightening force may not be restored for some of the bleed plugs, or, which is even worse, that they will not be tightened at all. A plug which is not properly tightened is potentially subject to the risk of further slackening as a result of the vibrations to which the brake is subjected in use, and may even be slackened completely, with disastrous results for the efficacy of the hydraulic brake circuit. This problem is even more serious in sports vehicles, since these are subject to continual adjustment operations, very frequently in conditions of stress and excitement which can cause even the most skilled workers to make possible errors.

To prevent the accidental unscrewing of the bleed plugs, it has been suggested that an arrangement for stopping the rotation be used, which meet the requirements, even if the bleed plug is not completely tightened, but these have the disadvantage of a considerable constructional and operational complexity.

A further disadvantage to which conventional bleed devices are subject is that they permit the infiltration of any dirt and/or water which may be present, thus contaminating the brake fluid, even if the plugs are provided with protective caps.

SUMMARY OF THE INVENTION

The present invention solves the longstanding and unresolved need for a bleed device that is structurally and functionally designed to provide rapid bleeding of hydraulic circuites while avoiding the disadvantages of known bleed plugs. For example, one embodiment of the present invention has a bleed duct comprising a one-way check valve that is closed during normal operation of the hydraulic circuit, but is capable of being opened during bleeding of the hydraulic circuit without loosening the bleed device from the hydraulic circuit.

BRIEF DESCRIPTION OF THE DRAWINGS

For the purpose of illustrating the present invention, representative embodiments are shown in the accompanying figures, it being understood that the present invention is not intended to be limited to the precise arrangements and instrumentalities shown.

DETAILED DESCRIPTION OF THE PREFERRED EMBODIMENTS

The present invention will now be described in detail for specific preferred embodiments. These embodiments are intended only as illustrative examples and the present invention is not to be limited thereto.

Figure 1:
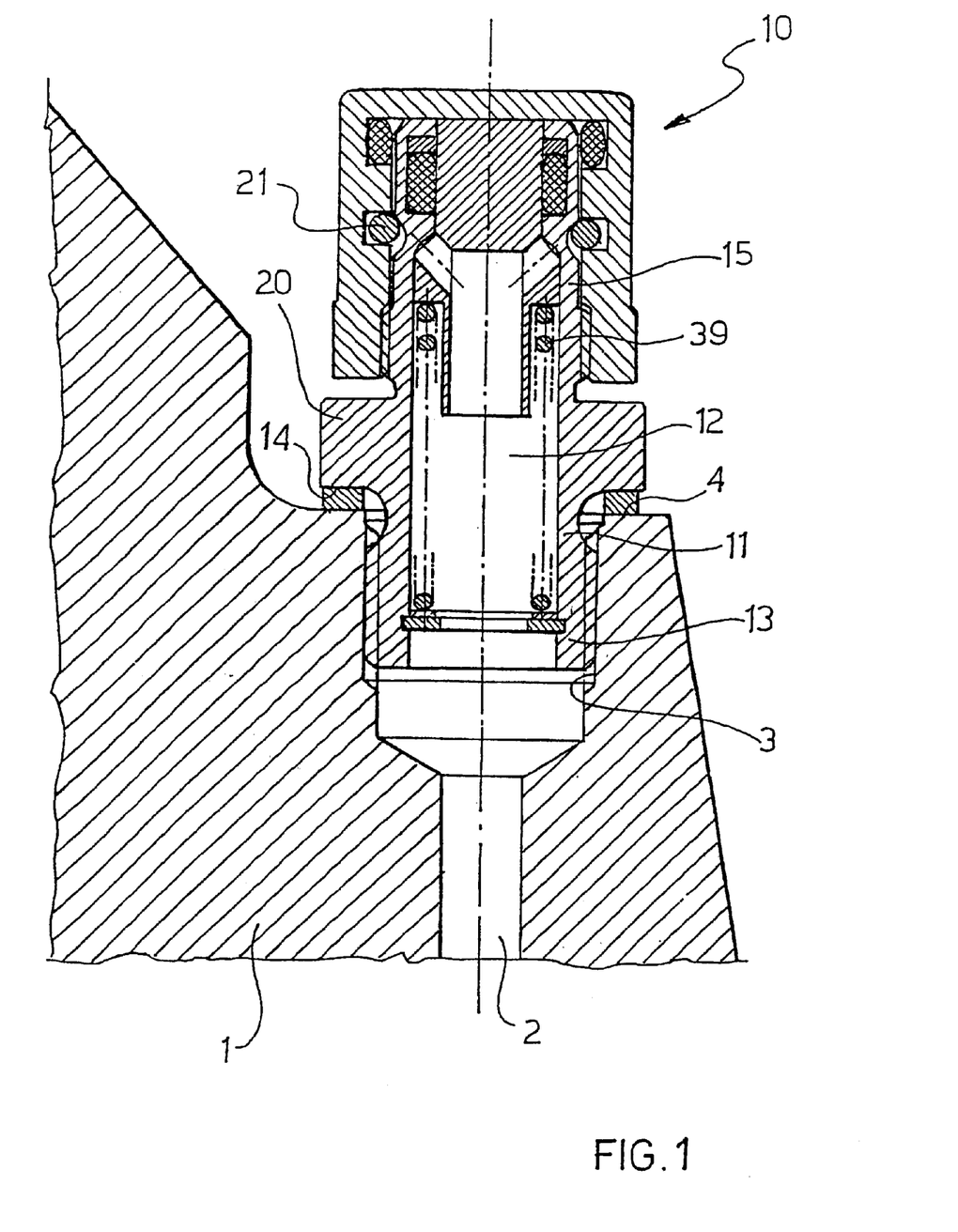
FIG. 1 illustrates an axial section of one example of a bleed device according to the present invention, as applied in a motor vehicle brake system.

In FIG. 1, the number 1 indicates part of a calliper for hydraulically operated disc brakes. The calliper 1 is connected to a hydraulic circuit for operating the brake, partly formed inside the calliper and of a conventional design, of which a short section 2, which opens into an internally threaded cylindrical aperture 3, is shown. A plane 4 is formed at the entry of the aperture 3.

For bleeding the air from the hydraulic circuit 2 when the hydraulic circuit is being topped up or maintained, the hydraulic circuit is provided with a plurality of bleed devices (at least one, as a rule, for each calliper), one of which, indicated by 10, is shown in the figure, fitted in the aperture 3 to seal it.

Figure 2:
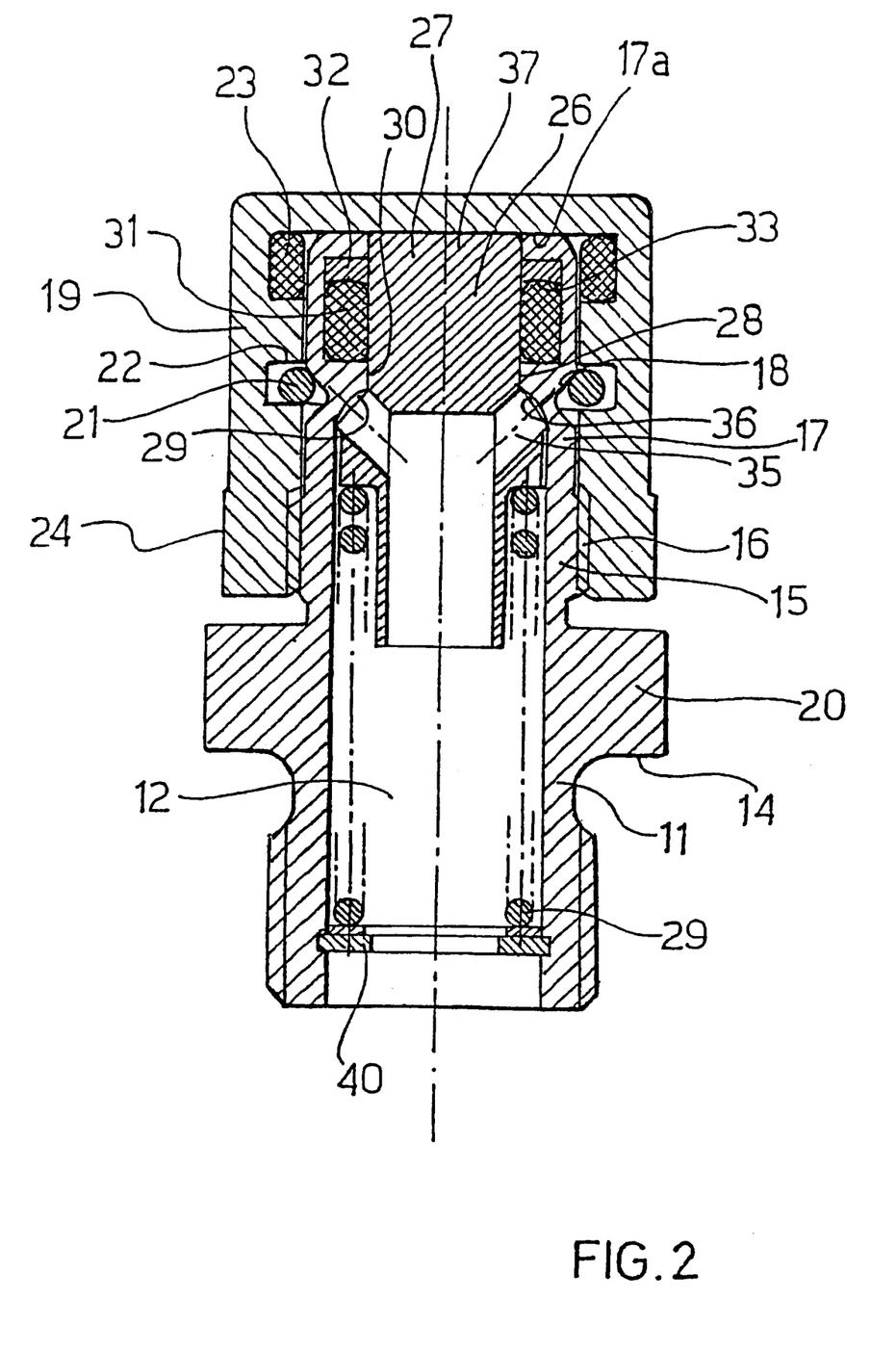
FIG. 2 is an enlarged view of the bleed device illustrated in FIG. 1.
Figure 3:
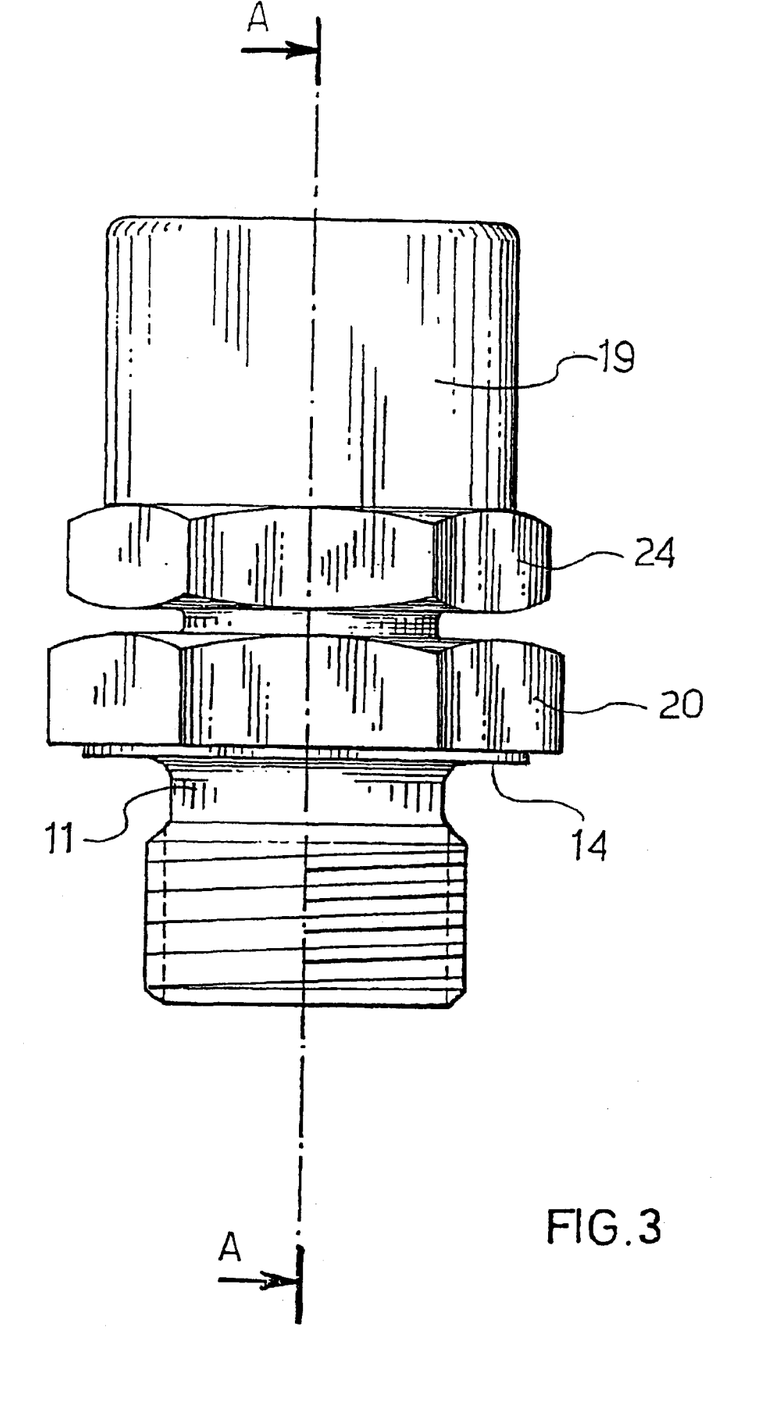
FIG. 3 is an enlarged elevational view of the bleed device illustrated in FIG. 1.

The device 10, of one embodiment of the invention, comprises a tubular body 11 in which an axial bleed duct 12 is formed and which has a flange 20 in the form of a polygonal key on its outside, in an intermediate portion. A first portion of the end 13 of the body 11 is externally threaded so that it can be screwed into the threaded portion of the aperture 3, the tightness of the joint being ensured by the interposition of a seal 14 between the plane 4 of the calliper 1 and a shoulder 14a of the flange 20.

A second and opposite end portion 15 of the body 1 has on its outside a second thread 16 followed by a cylindrical portion 17 in which a groove 18 is formed. The portion 17 terminates in a flat annular surface 17a extending radially at the free end of the tubular body 11.

A cap 19 is removably fitted on the second end portion 15 of the body 11 for the protection of the device 10 and for its further sealing from the exterior. The cap 19 is retained on the body 11 by engagement by screwing onto the second thread 16 and a further retaining arrangement is provided by an elastic washer 21 which is simultaneously engaged in the groove 18 and in a second groove 22 of the cap. The hydraulic seal and protection from dust is provided by a seal 23. The cap 19 is also formed externally with a polygonal key 24, preferably having a different and smaller size than that of the key of the flange 20, in order to avoid the risk of accidental unscrewing of the body 11 when the cap 19 is removed. With this configuration, the cap 19, when screwed and fitted on the tubular body 11, is retained securely on it by the double engagement of two independent securing elements, on the one hand the snap-fitting of the washer 21 in the grooves 18, 22 and on the other hand the connection by screwing on to the thread 16.

In the bleed duct 12 there is a non-return check valve 26 which is normally closed with respect to the outside of the hydraulic circuit 2, as explained below.

The valve 26 comprises an obturator 27 which is normally forced to close a valve seat 28 formed in the tubular body 11. The valve seat 28 comprises a truncated conical annular shoulder 29 and a cylindrical linear portion 30, having a narrower cross section than the bleed duct 12. The linear portion 30 is provided with a seal 31 and a retaining washer 32, both housed in the same cavity 33, and terminates under the flat surface 17a.

The obturator 27 has, in the end facing the aperture 3, an axial cavity 34 branching into ducts 35 which open on a truncated conical annular counter-shoulder 36. The counter-shoulder 36 normally bears on the shoulder 29; beyond this point, the obturator has a cylindrical head 37 which can engage slidably in a fluid-tight way in the linear portion 30 of the valve seat 28. The obturator 27 is acted upon by a spring 39 that is located between the obturator and an elastic washer 40, the elastic washer being retained in the bleed duct 12 near the first end of the bleeder device. The spring closes the obturator against the valve seat during normal operation of the hydraulic circuit, closing the valve seat 28.

In order to open the bleed duct in order to bleed the hydraulic circuit 2, it is thus sufficient to push the obturator 27 away from the valve seat 28 with a rod or similar, without the need to slacken the bleed device 10 in any way. When the pressure ceases, the obturator 27 is automatically returned to close the valve seat 28 by the spring 39, without any possibility of the bleed device remaining accidentally open or slackened.

To facilitate the bleeding operation, the present invention also proposes a kit specifically designed to be used with the bleed devices 10.

Figure 4:
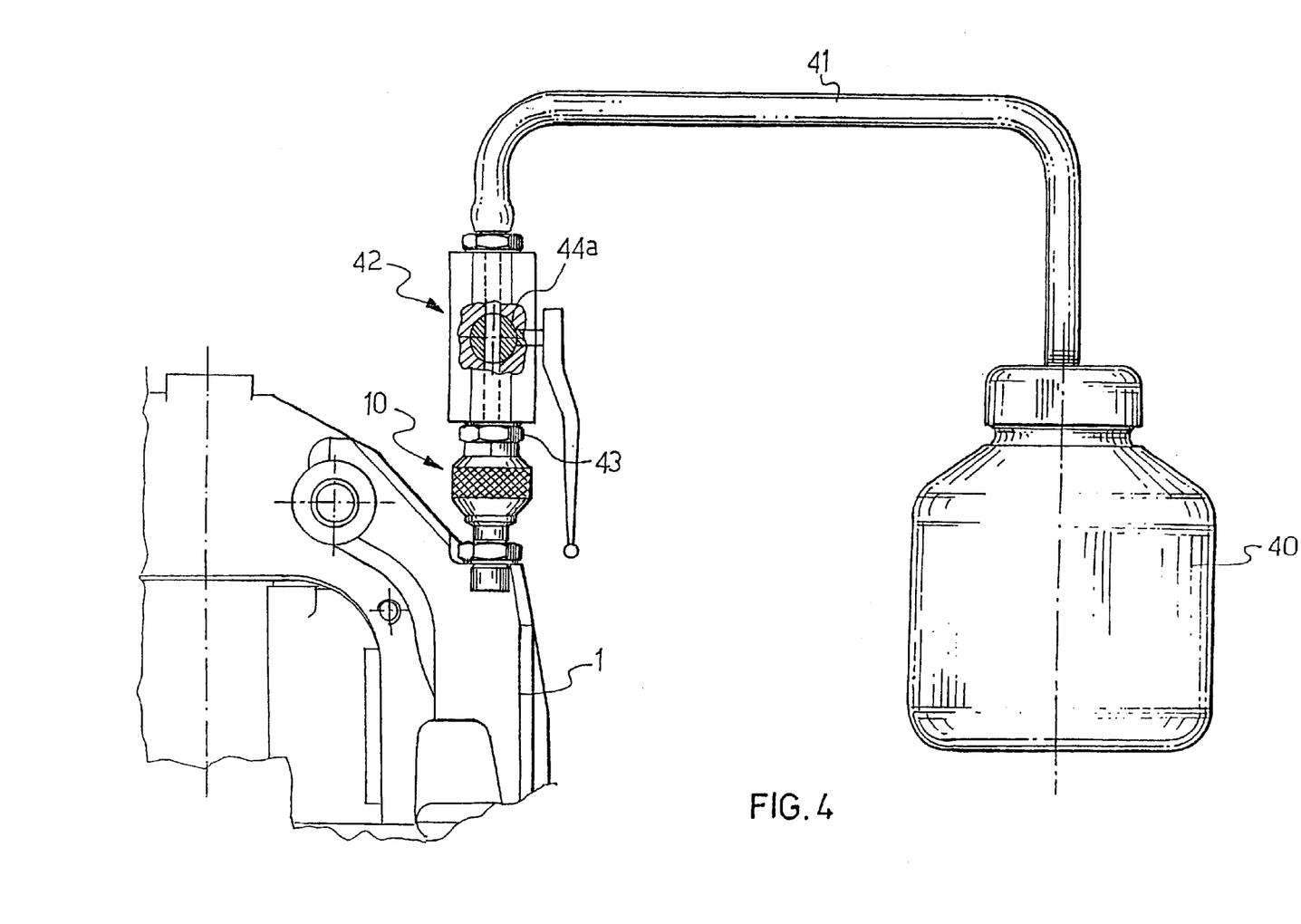
FIG. 4 shows schematically one embodiment of a kit for bleeding an hydraulic circuit of a brake system.
Figure 5:
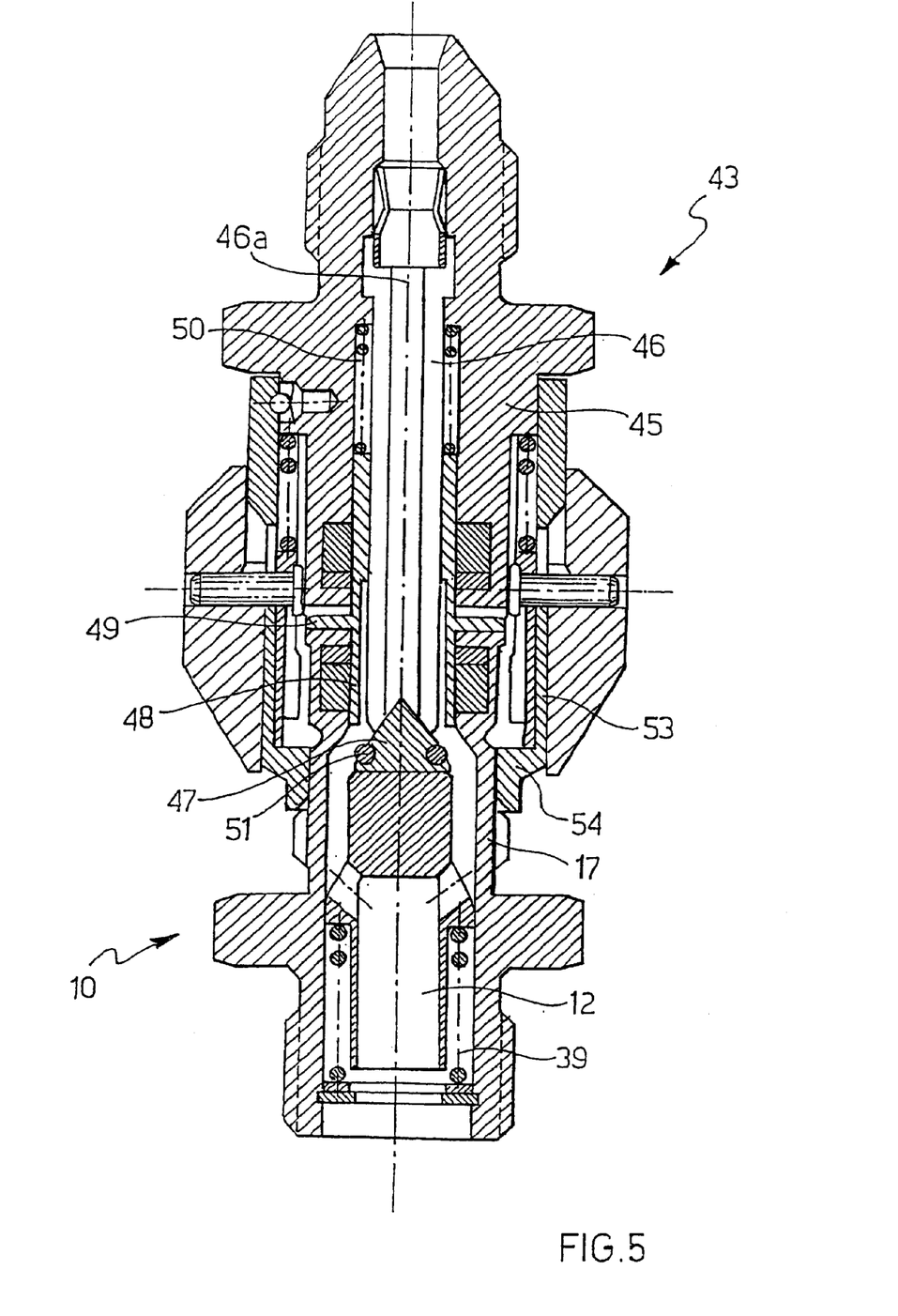
FIG. 5 illustrates an example of a quick release connector, as shown in FIGS. 4 and 6, for example.
Figure 6:
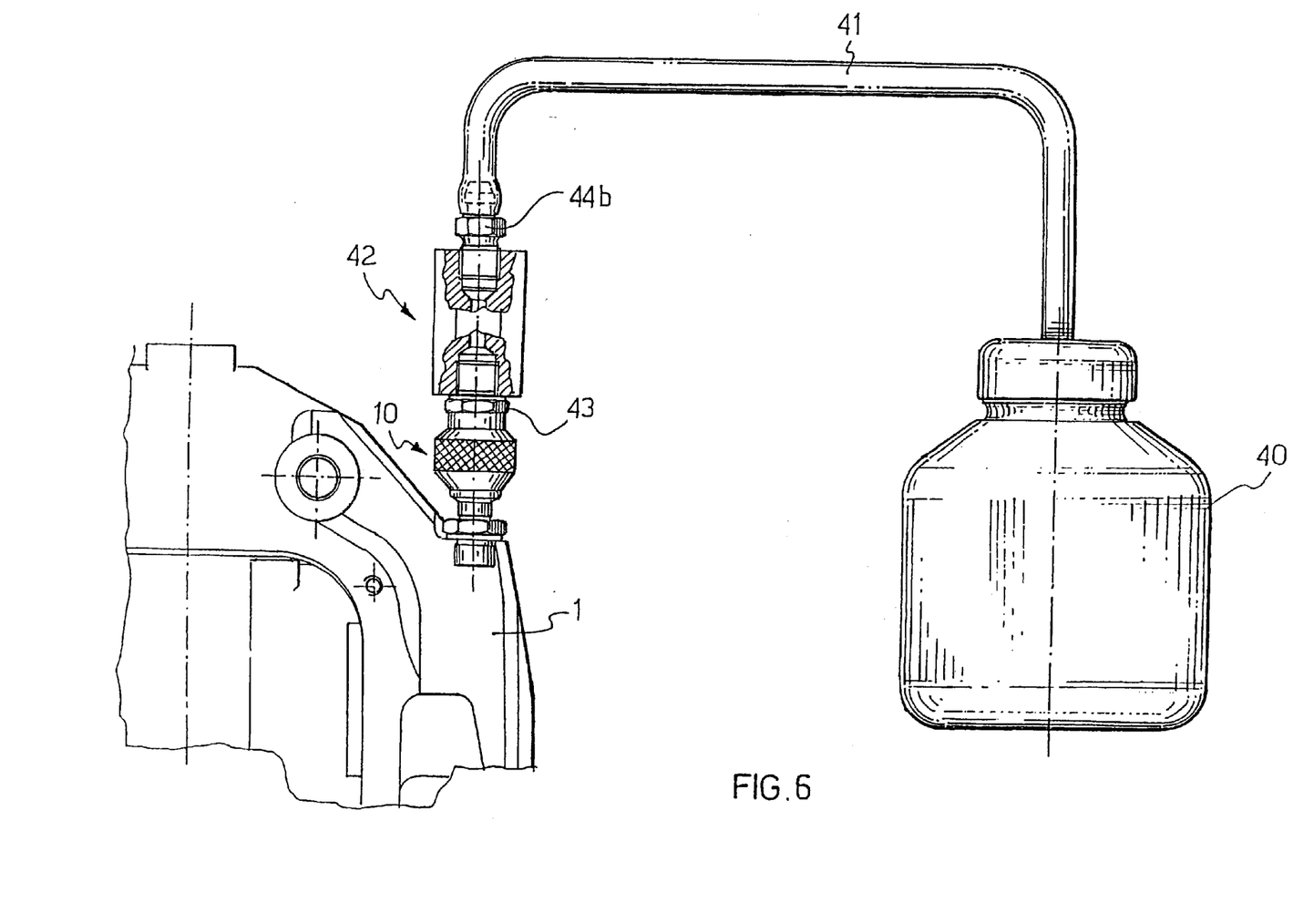
FIG. 6 illustrates another embodiment, in partial section, of a bleed kit for bleeding an hydraulic circuit.

With reference to FIGS. 4 and 6, this kit comprises a vessel 40 for collection of the bleed liquid, a tube 41 to connect the vessel 40 in a fluid-tight way to the a bleed device 10, a valve 42 for shutting off the tube 41, and a quick-release connector 43, for example as illustrated in FIG. 5, fitted to the valve 42 for the fast connection of the vessel 40 to the corresponding device 10.

In FIG. 4, the valve 42 is a conventional valve with a ball-shaped obturator 44a, while in FIG. 6 the valve, represented in partial sectional view, is a bleed device 44b of an embodiment of the present invention.

The connector 43 of one embodiment, for example as illustrated in FIG. 5, comprises a main body 45 having an axial passage 46 in which a rod 46a with a truncated conical head 47 is fitted in a permanent, but non-obstructive, way. In the passage 46 there is also fitted, slidably and in a fluid-tight way, a tubular sleeve 48, having a radial flange 49 in an intermediate position and normally forced by a spring 50 so that one of its ends bears on the shell of the head 47 to close the passage 46. The tightness between the sleeve 48 and the body 45 is ensured by a seal 51. Thus the system comprising the vessel 40, the tube 41 and the connector 43 is normally closed with respect to the exterior.

On the body 45 there is also fitted a nut 53 which, when the connector is engaged on the device 10, has its extension 54 fitted on to the cylindrical portion 17 of the tubular body 11. In this condition of engagement between the connector 43 and the bleed device 10, the head 47 of the rod 46, acting on the obturator 27, causes it to slide in opposition to the spring 39 and consequently causes the bleed duct 12 to open. At the same time, the tubular sleeve 48 is fitted in a fluid-tight way into the linear portion 30 of the valve seat 28 until its flange 49 bears on the surface 17a of the tubular body 11, resulting in the opening of the axial passage 46 by the withdrawal of the sleeve 48 from the head 47.

Thus a communication of fluid between the hydraulic circuit 2 and the bleed vessel 40 is established, this communication being controllable, for carrying out the bleeding operations, by way of the valve 42.

It will be noted that the distinctive configuration of the second end of the tubular body 11, with particular reference to the configuration of the valve seat 28 and its linear portion 30, ensures that this acts as a quick-release connection arrangement capable of interacting with the counter-arrangement of quick-release connection (the tubular sleeve, rod and nut) provided by the quick-release connector 43.

Thus the present invention resolves the problem which was raised, while providing numerous additional advantages, including:

improved reliability of the hydraulic circuit of the brake system, even when maintenance operations are carried out in conditions of stress and/or excitement;

improved retention of the cap on the brake bleed device;

the accidental unscrewing of the tubular body when the cap is unscrewed is prevented, owing to the different sizes of the operating keys;

the risk of leakage of hydraulic fluid in the proximity of the brake during the bleeding operations is eliminated;

the shut-off valve of the bleed tube leading to the bleed vessel can be positioned at any desired distance from the brake.

What is claimed is:

1. A bleed device for an hydraulic circuit having an aperture, the bleed device comprising:

a device in which extends a bleed duct, the device including a first end and a second end opposite to the first end, the first end being capable of closing the aperture;

a one-way check valve provided in the bleed duct, the one-way check valve being normally closed with respect to an exterior of the hydraulic circuit and being capable of being opened independently of one of a removal or a slackening of the device in the aperture; and a quick-release connector arrangement at the second end for use with a quick-release counter arrangement of a quick-release connector, wherein the quick-release connection arrangement is capable of forming a coupling with the quick-release counter arrangement in order to connect the bleed duct to a bleed liquid collection vessel and to achieve a simultaneous opening of the one-way check valve; and a protective cap capable of being received at the quick-release connection arrangement.

2. The bleed device according to claim 1, wherein:

the hydraulic circuit includes a brake circuit.

3. The bleed device according to claim 1, wherein:

the device includes a tubular body into which the bleed duct extends, and the one-way check valve includes:
- an obturator that is axially movable within the bleed duct,
- a valve seat is formed in the bleed duct, and
- an elastic member acts on the obturator to force the obturator to close the valve seat.

4. The bleed device according to claim 3, wherein:

the valve seat is formed in the bleed duct opposite to the first end.

5. The bleed device according to claim 3, wherein:

the obturator includes:
- a cylindrical head arranged at an axial end of the obturator, the cylindrical head being housed slidably in a fluid-tight way in a cylindrical linear portion of the valve seat, and
- at least one annular shoulder capable of performing a bearing function in a fluid-tight way on a corresponding annular counter-shoulder of the valve seat when the cylindrical head is received by the cylindrical linear portion of the valve seat.

6. The bleed device according to claim 4, wherein:

the valve seat comprises a cylindrical linear portion and an annular counter-shoulder, and the obturator comprises:
- a cylindrical head arranged at an axial end of the obturator, the cylindrical head being housed slidably in a fluid-tight way in the cylindrical linear portion of the valve seat, and
- at least one annular shoulder capable of performing a bearing function in a fluid-tight way on the corresponding annular counter-shoulder of the valve seat when the cylindrical head is received by the cylindrical linear portion of the valve seat.

7. The bleed device according to claim 1, further comprising:

a plurality of securing elements that are independent of each other and for fitting the protective cap to the device.

8. The bleed device according to claim 7, wherein:

at least one of the plurality of securing elements includes a threaded connection between the protective cap and the device.

9. The bleed device according to claim 7, wherein:

at least one of the plurality of securing elements includes a snap-fitting retaining connection between the protective cap and the device.

10. The bleed device according to claim 8, wherein:

at least another one of the plurality of securing elements includes a snap-fitting retaining connection between the protective cap and the device.

11. The bleed device according to claim 7, wherein:

the protective cap includes on an external surface thereof a first polygonal key that enables the protective cap to be rotated, the device includes on an external surface thereof a second polygonal key that enables the device to be rotated, and a size of the first polygonal key is different from a size of the second polygonal key to prevent an accidental slackening of the device when the protective cap is rotated.

12. The bleed device according to claim 11, wherein the first polygonal key is smaller than the second polygonal key.

13. A kit for bleeding an hydraulic circuit, comprising:

a quick release connector; and at least one bleed device, the bleed device comprising:
- a device in which extends a bleed duct, the device including a first end and a second end opposite to the first end, the first end being capable of closing an aperture of the hydraulic circuit,
- a one-way check valve provided in the bleed duct, the one-way check valve being normally closed with respect to an exterior of the hydraulic circuit and being capable of being opened independently of one of a removal and a slackening of the device in the aperture, and
- a quick-release connector arrangement at the second end for use with a quick-release counter arrangement of the quick-release connector, wherein the quick-release connection arrangement is capable of forming a coupling with the quick-release counter arrangement in order to connect the bleed duct to a bleed liquid collection vessel and to achieve a simultaneous opening of the one-way check valve; and
- a protective cap capable of being received at the quick-release connection arrangement, and wherein the quick-release connector includes a quick-release counter-arrangement and a rod to act on the one-way check valve, wherein the rod acts to open the one-way check valve when the quick-release connection arrangement and the quick-release counter arrangement are coupled.

* * * * *

UNITED STATES PATENT AND TRADEMARK OFFICE
CERTIFICATE OF CORRECTION

PATENT NO. : 6,669,169 B2
DATED : December 30, 2003
INVENTOR(S) : Raffaello Cornolti et al.

It is certified that error appears in the above-identified patent and that said Letters Patent is hereby corrected as shown below:

Column 2,
Line 2, change "circuites" to -- circuits --.

Signed and Sealed this

Tenth Day of January, 2006

JON W. DUDAS
*Director of the United States Patent and Trademark Office*